(12) United States Patent
Silverstein et al.

(10) Patent No.: US 12,327,078 B2
(45) Date of Patent: Jun. 10, 2025

(54) SIGNATURE DISCOURSE TRANSFORMATION

(71) Applicant: International Business Machines Corporation, Armonk, NY (US)

(72) Inventors: Zachary A. Silverstein, Georgetown, TX (US); Jonathan D. Dunne, Dungarvan (IE); Norton Samuel Augustus Stanley, Bangalore (IN); Hemant Kumar Sivaswamy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 18/211,331

(22) Filed: Jun. 19, 2023

(65) Prior Publication Data
US 2024/0419890 A1 Dec. 19, 2024

(51) Int. Cl.
| | | |
|---|---|---|
| *G06F 17/00* | (2019.01) | |
| *G06F 40/151* | (2020.01) | |
| *G06F 40/166* | (2020.01) | |
| *G06F 40/20* | (2020.01) | |

(52) U.S. Cl.
CPC .......... *G06F 40/151* (2020.01); *G06F 40/166* (2020.01); *G06F 40/20* (2020.01)

(58) Field of Classification Search
CPC ...... G06F 40/151; G06F 40/166; G06F 40/30; G06F 40/35; G06F 40/20
See application file for complete search history.

(56) References Cited

U.S. PATENT DOCUMENTS

| | | | |
|---|---|---|---|
| 10,733,220 B2 * | 8/2020 | Burchfield | G06F 16/93 |
| 10,783,314 B2 * | 9/2020 | Dernoncourt | G06F 40/106 |
| 10,929,453 B2 * | 2/2021 | Malon | G06F 16/93 |

(Continued)

FOREIGN PATENT DOCUMENTS

| | | | | |
|---|---|---|---|---|
| CN | 112015904 A | * | 12/2020 | G06F 16/367 |
| WO | WO-2012061462 A1 | * | 5/2012 | G06F 16/3329 |

OTHER PUBLICATIONS

Gee, Anonymouth Hides Identity, Aug. 4, 2013, https://www.iprogrammer.info/news/105-artificial-intelligence/6197-anonymouth-hides-identity.html.

(Continued)

*Primary Examiner* — Laurie A Ries
(74) *Attorney, Agent, or Firm* — Garg Law Firm, PLLC; Rakesh Garg; Michael O'Keefe

(57) ABSTRACT

The illustrative embodiments provide for signature discourse transformation. An embodiment includes detecting a signature discourse of a user by analyzing the user's discourse using corpus linguistics. The embodiment also includes generating computing a collection of words distinct to the user. The embodiment also includes sensing, using tone analysis and a natural language process model, a tone of the collection of words distinct to the user in the signature discourse utterance. The embodiment also includes mapping a cartesian value of the collection of words distinct to the user. The embodiment also includes deriving a signature discourse transformation (SDT) model from the signature discourse utterances, the collection of words, the tone, and the cartesian value. The embodiment also includes transforming, using the signature discourse transformation, an original discourse by the user into an anonymized text.

20 Claims, 7 Drawing Sheets

(56) References Cited

U.S. PATENT DOCUMENTS

| | | | |
|---|---|---|---|
| 2002/0138528 A1* | 9/2002 | Gong | G06Q 10/02 |
| | | | 715/255 |
| 2006/0200341 A1* | 9/2006 | Corston-Oliver | G06F 40/253 |
| | | | 707/E17.09 |
| 2011/0184729 A1* | 7/2011 | Nam | G06F 16/36 |
| | | | 704/9 |
| 2017/0249479 A1* | 8/2017 | Gordon | G06F 40/166 |
| 2017/0250959 A1 | 8/2017 | Gordon et al. | |
| 2019/0205743 A1* | 7/2019 | Jiang | G06F 16/313 |
| 2019/0294725 A1* | 9/2019 | Trim | G06F 40/00 |
| 2020/0401878 A1 | 12/2020 | Hewitt et al. | |
| 2021/0073336 A1 | 3/2021 | Fox et al. | |
| 2022/0237390 A1 | 7/2022 | Ridgill, II et al. | |
| 2023/0297784 A1* | 9/2023 | Lopez Garcia | G06Q 10/067 |
| 2024/0169160 A1* | 5/2024 | Ein-Dor | G06F 40/205 |
| 2024/0202518 A1* | 6/2024 | Eisner | G06N 3/08 |
| 2024/0281594 A1* | 8/2024 | Rao | G06F 40/166 |

OTHER PUBLICATIONS

Thiel, Preventing Response Bias on Employee Engagement Surveys, Mar. 5, 2020, https://elearningindustry.com/preventing-response-bias-on-employee-engagement-surveys.

Prins, How to Reduce the Risk of Response Bias in Your Surveys, Sep. 9, 2019, https://www.getfeedback.com/resources/online-surveys/how-to-reduce-the-risk-of-response-bias-in-your-surveys/.

Primalogik, Employee Satisfaction Surveys: How to Remove Biases and Collect Proper Data, Jan. 18, 2017, https://primalogik.com/blog/employee-satisfaction-surveys-how-to-remove-biases-and-collect-proper-data/.

Gurchiek, Try These Strategies to Reduce Implicit Bias in Your Workplace, Apr. 22, 2020.

* cited by examiner

SIGNATURE DISCOURSE TRANSFORMATION

BACKGROUND

The present invention relates generally to transforming the text of a user to remove unique tone and word usage. More particularly, the present invention relates to a method, system, and computer program for identifying, analyzing, and transforming a user's unique writing style to gain anonymity of a user's writing particularly in survey situations.

Surveys are given to people in group setting to solicit truthful feedback. For example, surveys are given in workplaces to offer employees a chance to provide constructive feedback on both the work environment and the supervisory personnel. Surveys are also given at an end of an academic term to give students a chance to rate their professor's teaching methods in the classroom and office hours. The feedback is often delivered in both long form and short form discourse. A problem with providing freely written feedback is that the author of the feedback can be determined by the reader when the reader knows the writing style of the author. This is particularly noticed when the survey population is semi-known to the reader such as in small employee work groups.

Individuals speak and write using a unique style. This style may include particular word choice, a tone, collocations, and colligations. Collocations as used herein is the habitual juxtaposition of a particular word with another word or words with a frequency greater than chance. For example, a person may use the term awesome every time something goes well. The use of the word awesome instead of another positive word could reveal the identity of the person completely the "anonymous" survey which could influence how the feedback given in the survey is received by the receiver of the review.

Therefore, a need exists for a way to make the freeform written text of a user less identifiable to a reader. This is especially true in a small setting such as a work environment where a direct supervisor is reading the response of an employee. This can also be useful in a class environment where a reader is very familiar with the writing and speech patterns of an author after several months of reading the author's assignments.

SUMMARY

The illustrative embodiments provide for signature discourse transformation. An embodiment includes detecting a signature discourse of a user by analyzing the user's discourse history. The signature discourse can be detected using corpus linguistics. The embodiment also includes generating computing a collection of high frequency words distinct to the user. The embodiment also includes sensing, using tone analysis and a natural language process model, a tone of the collection of high frequency words distinct to the user in the signature discourse utterance. The embodiment also includes mapping a cartesian value of the collection of high frequency words distinct to the user. The embodiment also includes deriving a signature discourse transformation (SDT) model from the signature discourse utterances, the collection of high frequency words, the tone, and the cartesian value. The embodiment also includes transforming, using the signature discourse transformation, an original discourse by the user into an anonymized text. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
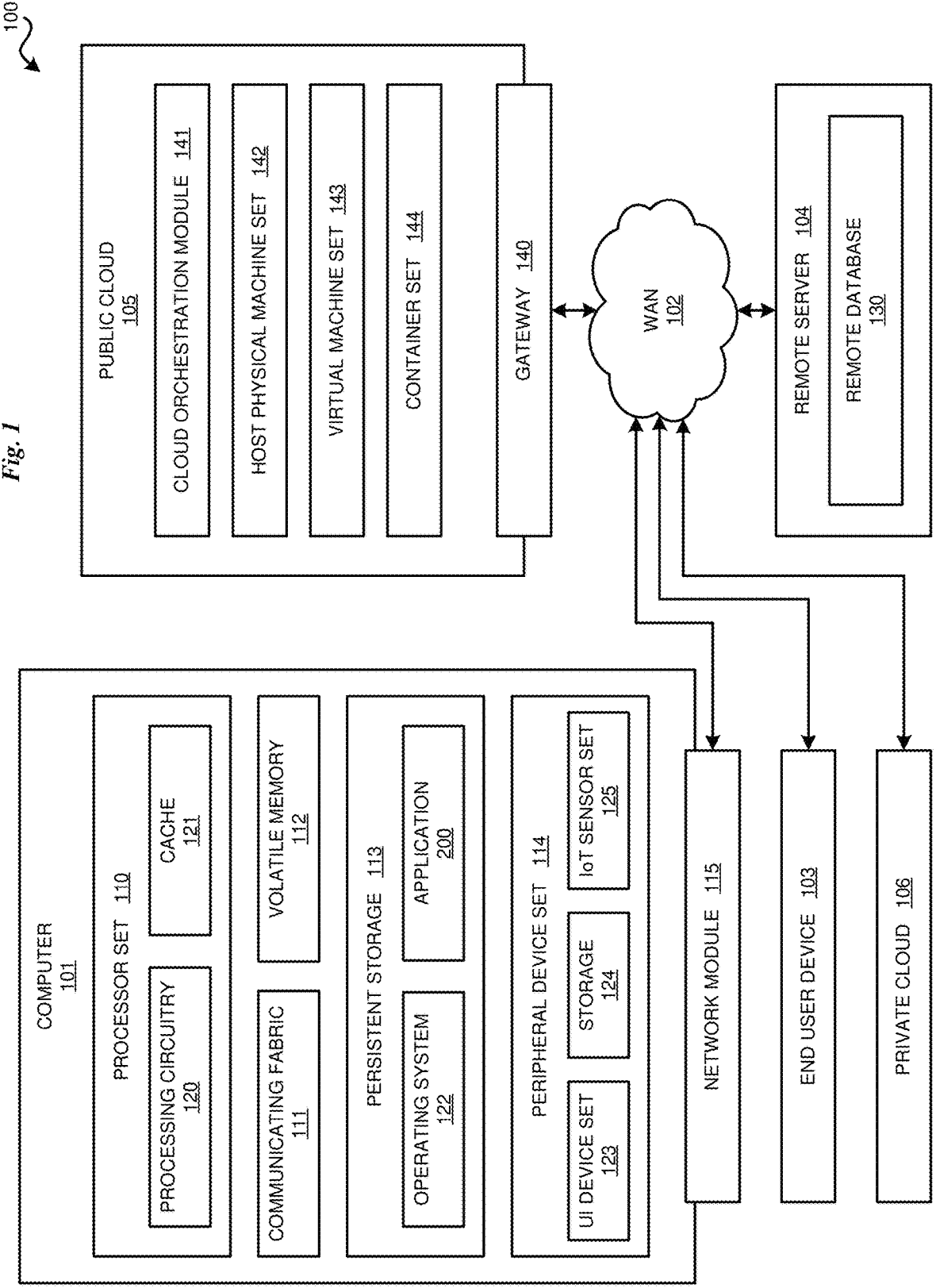
FIG. 1 depicts a block diagram of a computing environment in accordance with an illustrative embodiment.

Individuals are asked to provide feedback or respond to surveys in long form, short form, and multiple-choice responses. A problem with this is when surveys are read and the survey population is semi-known to the reviewer, the long form and short form free responses may expose the identity of the individual user. This is because humans speak and write using a signature system of discourse and utterances. For example, humans speech can be described as using collocation or the habitual juxtaposition of a particular work with another word or words with a frequency greater than chance. Humans also use colligations which is a type of collocation where a word or lexical item is tied to a grammatical item. These patterns of speech are unique to each individual and make the writing and speaking of an individual able to be discerned by someone familiar with the writer.

Surveys are an important way for employers and supervisors to receive feedback from employees and staff. There are many ways that employer-provided surveys fail to give an accurate portrait of a work environment. The best way to receive the data is in an anonymous way so that users feel free to give honest feedback without fear of repercussions. Therefore, there exists a need to allow a user to anonymize the user's response in a long form or short form survey in a way that does not remove the original meaning from the response.

A combination of corpus linguistics, tone analysis, word2vec and linear algebra can be used to derive a Signature Discourse Transformation (SDT) model that can be used to transform an original writing of a user to aid the anonymization of the user's response as part of a confidential survey responses. Corpus linguistics referred to herein may include a methodology that involves computer-based empirical analyses of language use. Corpus linguistics can be quantitative and qualitative. Corpus linguistics uses large, electronically available collections of naturally occurring spoken and written texts. Corpus referred to herein may include an amount of written and spoken text. As used herein the corpus may include emails, texts, messages, and work product of a user. Tone analysis referred to herein may include analysis of a sampling of a user's written words include high frequency words, collocations, and colligations to identify the tone of a single or collection of word. Tone referred to herein includes the general voice or attitude of the user in the user's signature discourse history and original writings. For example, the user may have a pleasant tone, positive tone, or a sad tone. Other examples of tone in reference to the user may include disgust, or anger. As used herein tone is not a music note or vocal sound. Word2vec referred to herein may include an algorithm for natural language processing (NLP). The word2vec algorithm may use a neural network model to learn word associations from a large corpus of text. Word2vec may be able to detect synonymous words or suggest additional words for a partial sentence.

Embodiments of SDT transform a user's signature discourse utterance to create an anonymized version of an original writing. A user's signature discourse utterance are words and phrases that the user repeatedly uses and make the user's writing and speech unique to the user. An anonymized text referred to herein is a product of the SDT where the author of the original writing is not able to be determined by the reader. The author referred to herein is also referred to as the user. In some embodiments, a linguistic monument is also a portion of the user's signature discourse utterance. The linguistic monument is a word or phrase used often by the user in the user's writing and speech. These linguistic monuments may be removed by the SDT to create the anonymized text.

The illustrative embodiments provide for signature discourse transformation. A signature referred to herein is unique to an individual user and may be a link to the identity of the user. Discourse referred to herein is any writing or style of writing by the user. Therefore, a signature discourse referred to herein is a writing having a style, tone, word usage that is unique to the individual writing a review. Transformation as referred to herein is a process and method for taking an original writing by a user and changing it through a computer system and process to make it anonymous. Transformation is necessary to ensure that the user feels comfortable giving a full and truthful assessment of the user's workplace, work environment, co-workers, and supervisor in a survey that is created to be anonymous. A survey is anonymous when no name is given in connection with the survey. Anonymous surveys may be facilitated through online platforms such as, but not limited to Survey Monkey. In other implementations, a user may type up the user's response to surveys on a word processing program on a computer, use the method of signature discourse transformation to anonymize the responses, and then print the responses to be deposited into a mailbox of a workplace, supervisor, or other receptacle for surveys that are wanted as anonymous. However, use of this example is not intended to be limiting but is instead used for descriptive purposes only.

A method of transforming a signature disclosure may include analyzing a user's discourse history using corpus linguistics to determine the user's signature discourse utterances. The user's discourse history may include emails, messages, texts, written work product, and other writing samples of a user. The corpus linguistic analysis can determine the term frequency of distinct works and a user's collocations and colligations. High frequency words referred to herein include words that the user uses repeatedly in the user's normal speaking and writing. For example, a user may frequently use the word "awesome" when the user is pleased with a situation or outcome. A collection of words referred to herein includes high frequency word of the user, collocations, and colligations. The method may also include conducting additional retrieval analysis using tone analysis and word2vec modelling. Tone analysis will identify the tone of a single or collection of words. Word2Vec modelling may match signature words of the user with similar words having the same tone and meaning but not identifiable as being used often by the user. The method may also include mapping the cartesian values of the high-frequency words of the user and the collocations and colligations of the user.

The method may include deriving a Signature Discourse Transformation (SDT) using the data from the analysis of the user's discourse history. The SDT model uses the outputs of the analysis to identify the key terms and collocations within the cartesian geometry. The SDT model may then be used to transform an original writing of the user such as by non-limiting example, the user's responses to the employer survey. Transformation may use linear algebra, such as by non-limiting example, an affine transformation to transform the x, y coordinates while also validating the meaning and tone of the original words and collocations are maintained. As referred herein, an affine transformation is a geometric transformation that preserves collinearity and ratio of distances. Such as for example, if the user uses the term "amazing" frequently the SDT may change the word to "impressive" so that the sentiments of the user are maintain while the identity of the user is concealed.

The SDT model can be generalized across distinct individuals such as, by non-limiting example, a group of employees providing feedback to a supervisor or employer at large. Embodiments of the SDT may also be used by students when filling out class reviews or reviews of professors. Embodiments of a SDT can be used in any setting where the identity of a user or writing is wanting to be concealed beyond just removing the name of the user. The SDT model can also be used to compare the writings of the original individual user to other writings by the individual user.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures, therefore, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as including application 200, which is configured for transforming the signature discourse of a user, and which detects a signature discourse utterance by analyzing the user's discourse history, derives a signature discourse transformations model and transforms an original writing by a user into an anonymized text. In addition to application 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and application 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in application 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in application 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
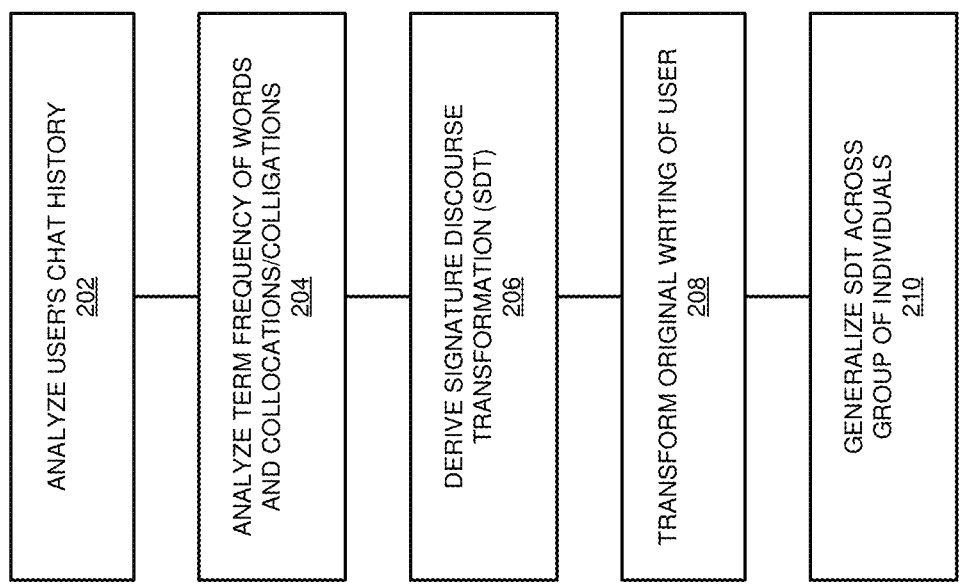
FIG. 2 depicts a flowchart of an example of a method of transforming the signature discourse of a user in accordance with an illustrative embodiment.

With reference to FIG. 2, this figure depicts a flow chart of an example method of signature discourse transformation 201 in accordance with an illustrative embodiment. In the illustrated embodiment, method 201 includes the end user device 103 of FIG. 1 initializing the detection of a signature discourse utterance of user using the processor set 110. The method illustrated in FIG. 2 includes analyzing the user's chat history to determine the signature discourse utterance of the user. In various implementations, the method may also include analyzing the email history, message history, and work product of the user. The method also includes analyzing the user's discourse history to compute a term frequency of a word distinct to the user 204. In other embodiments, the words distinct to the user may be referred to high frequency words. The method also includes detecting collocations and colligations of the user. The method also includes sensing a tone of the collection of words distinct to the user in the signature discourse utterance. The tone may be sensed through tone analysis as will be further illustrated in FIG. 4. The method also includes mapping a cartesian value of the high frequency words of the user. The method also includes deriving a signature discourse transformation (SDT) 206. Deriving a SDT may include using the outputs of the analysis from the user's discourse history, tone analysis, word2vec modelling, and cartesian graphing to identify key terms, collocations, and colligations within the cartesian geometry. The method also includes transforming 208, using the SDT, the original writing of the user to an anonymized version of the original writing. In various embodiments, the method may also include generalizing the SDT across a group of individuals to further ensure that the identity of the user is unknowable to the reviewer of the surveys.

Figure 3:
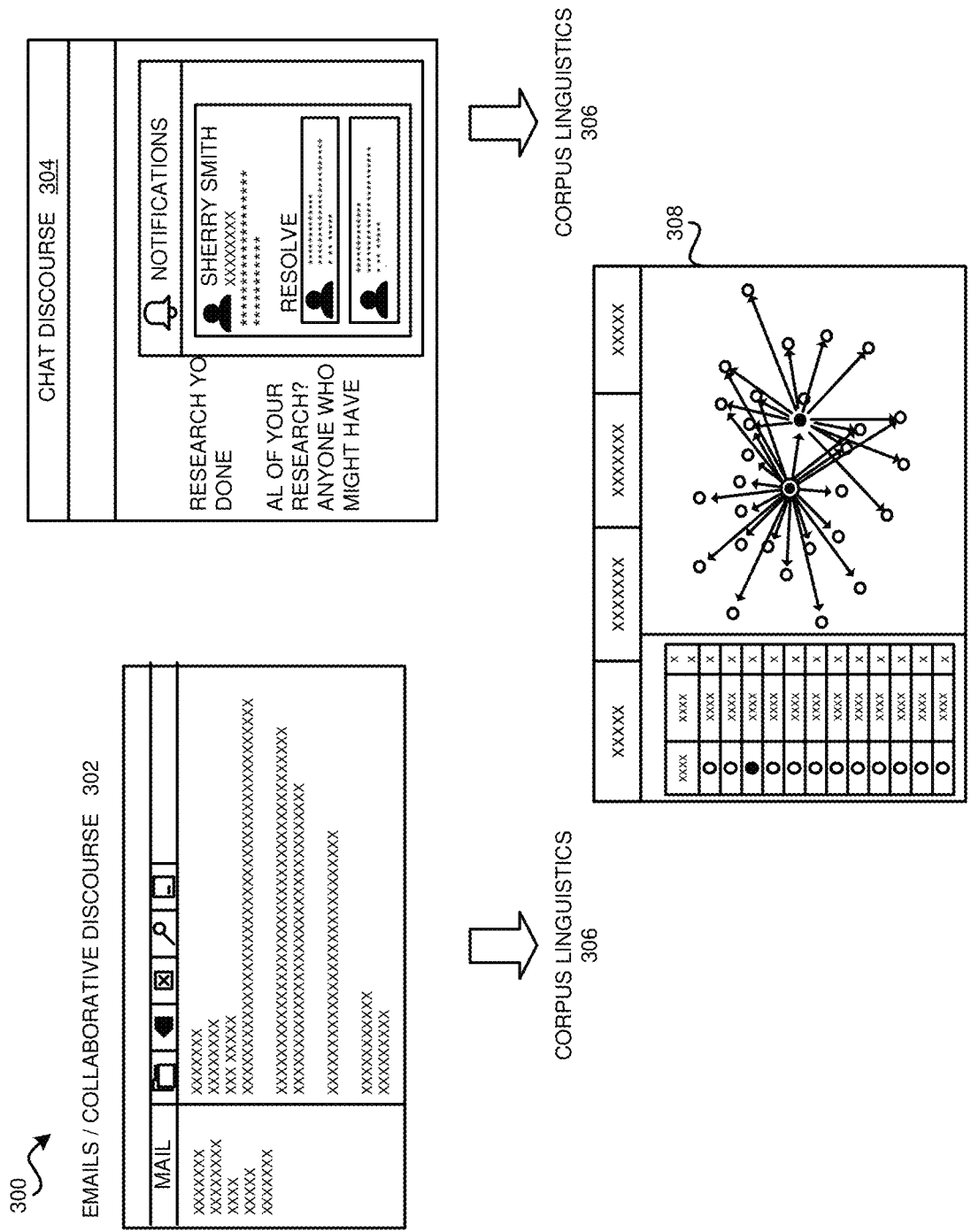
FIG. 3 depicts a block diagram of an example analysis of a user's discourse history in accordance with an illustrative embodiment.

With reference to FIG. 3, this figure depicts a block diagram of an example of an analysis 300 of a user's discourse history. As illustrated in the figure corpus linguistics 306 are applied to a set of emails 302 by the user. In various implementations, the user's discourse history may also include collaborative discourse with colleagues. As illustrated, the user's discourse history may include chat discourse 304. In various embodiments, the chat discourse may be correspondence with a teacher, professor, or supervisor. As illustrated, corpus linguistics is applied individually to the elements of the user's discourse history. The method can detect the user's signature discourse by determining the term frequency of distinct words and a user's collocations and colligations. The results are then compiled 308 to determine high frequency words, collocation, and colligations of the user to determine the user's signature discourse.

Figure 4:
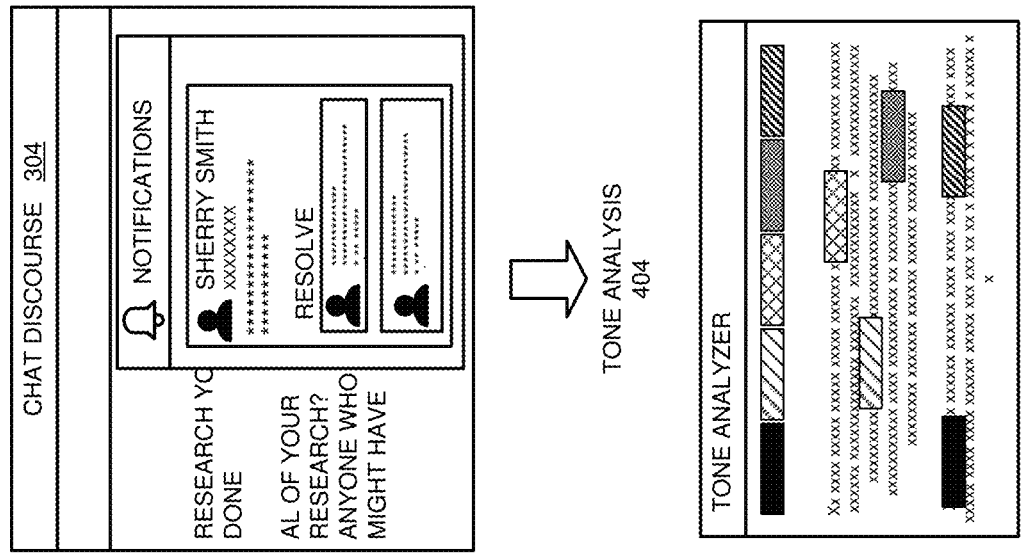
FIG. 4 depicts a block diagram of an example analysis of a user's discourse history to determine tone and word frequency of a user's signature discourse in accordance with an illustrative embodiment.
Figure 4:
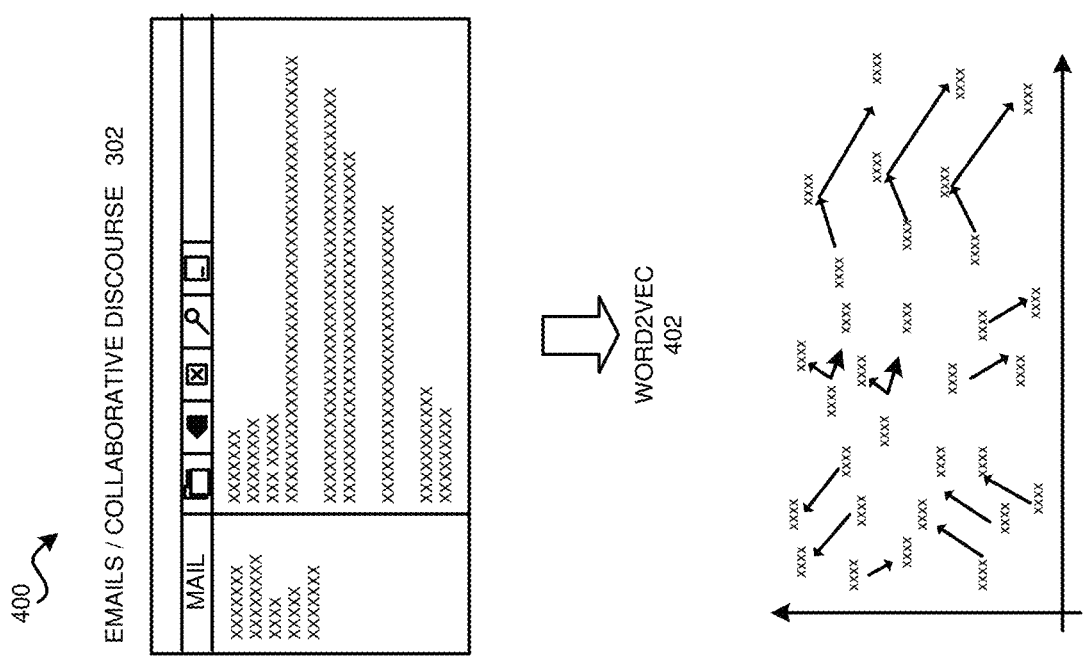

With reference to FIG. 4, this figure depicts a block diagram of an example of additional processing 400 of the user's signature discourse history. In the illustrated embodiment, the emails 302 and chat discourse 304 are further analyzed using word2vec modelling 402 and tone analysis 404. Though each of word2vec modelling and tone analysis are illustrated as only performed on a portion of the user's signature discourse history, both techniques are performed on the entire discourse history. These steps will identify the tone of a single or collection of words, additionally, the method includes mapping the cartesian values of the high-frequency words, collocations, and colligations.

Figure 5:
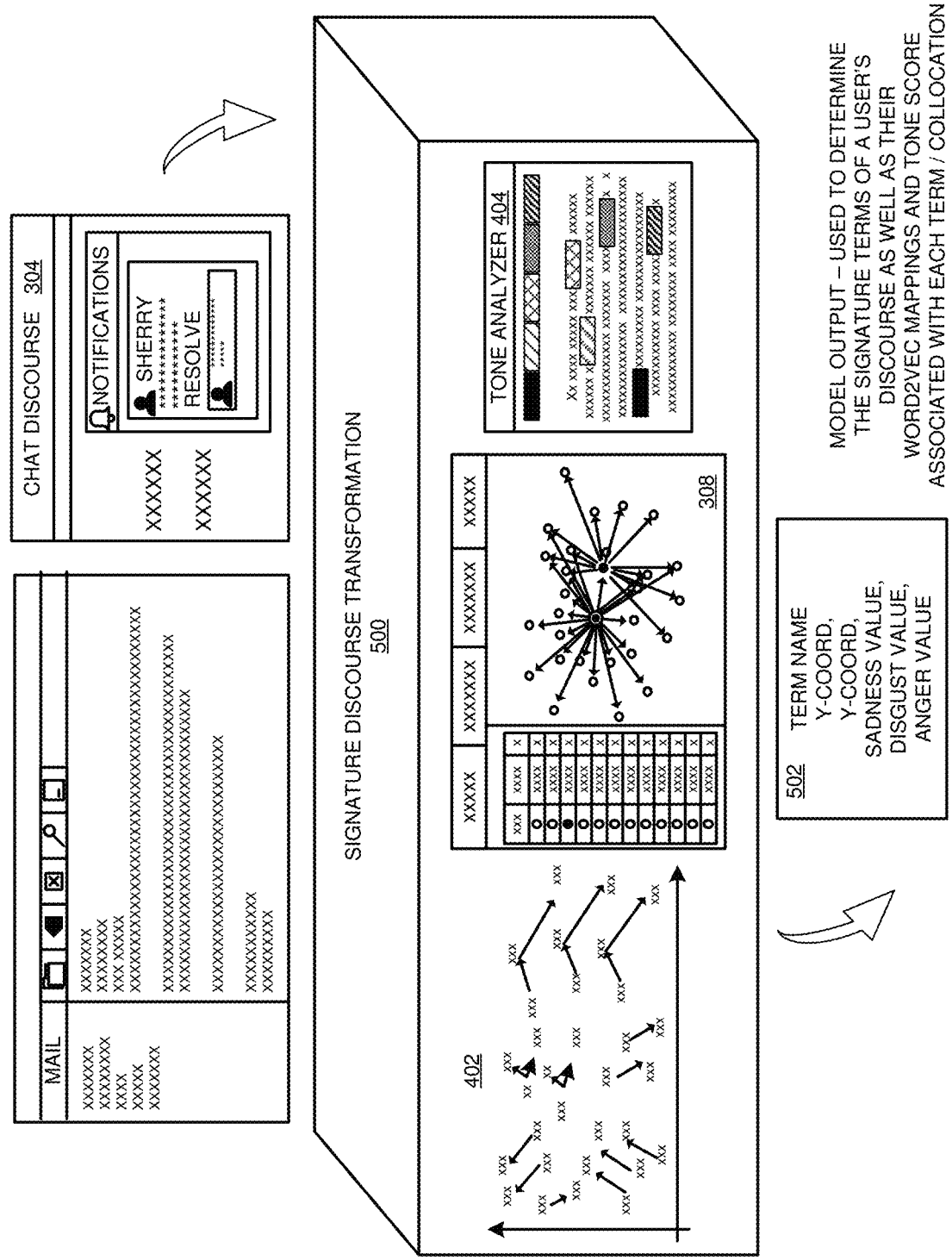
FIG. 5 depicts a block diagram of an example creation of Signature Discourse Transformation (SDT) in accordance with an illustrative embodiment.

With reference to FIG. 5, this figure depicts a block diagram of an example of a signature discourse transformation (SDT) model 500. The SDT model is derived from the analysis of the steps in FIGS. 3 and 4. As illustrated, the model uses the outputs 402, 308, and 404 to identify the key terms and collocations within the cartesian geometry 502.

Figure 6:
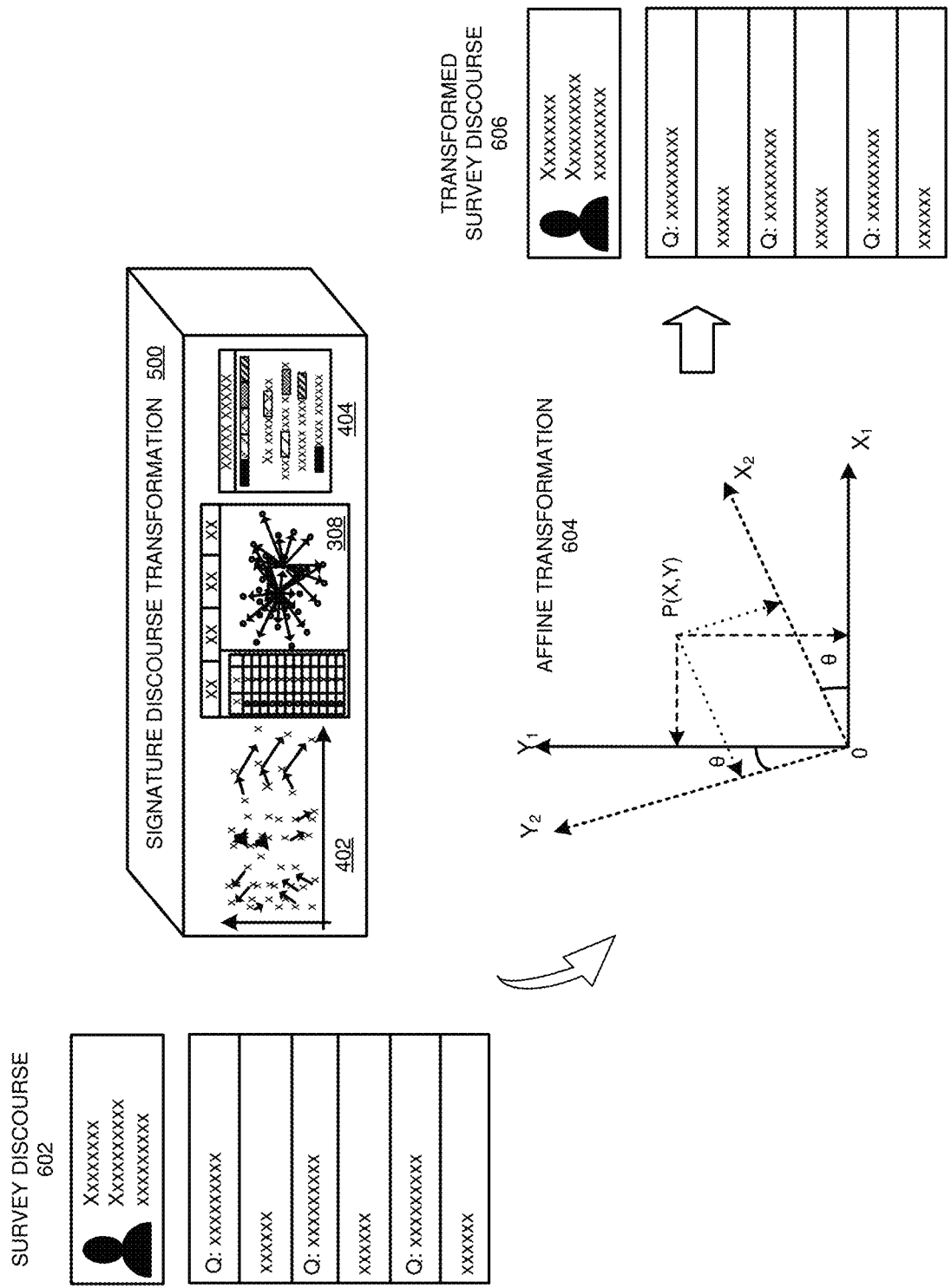
FIG. 6 depicts a block diagram of an example transformation of a user's original writing using an illustrative embodiment of a Signature Discourse Transformation (SDT) in accordance with an illustrative embodiment.

Referring to FIG. 6, the SDT model 500 is then used to transform an original writing 602 of the user. As illustrated here, the original writing is the survey discourse 602. The SDT model 500 is applied to the original writing to change signature words and phrases of the user while maintaining tone and meaning. The method further includes using linear algebra, such as affine transformation 604 to transform the x, y coordinates while validating that the meaning and tone of the original words are respected. In various embodiments, the original words may include a collection of high frequency words, collocations, and phrases. Once the original writing has been transformed by the SDT model 500, the identity of the user as perceptible by the user's writing has been concealed.

Figure 7:
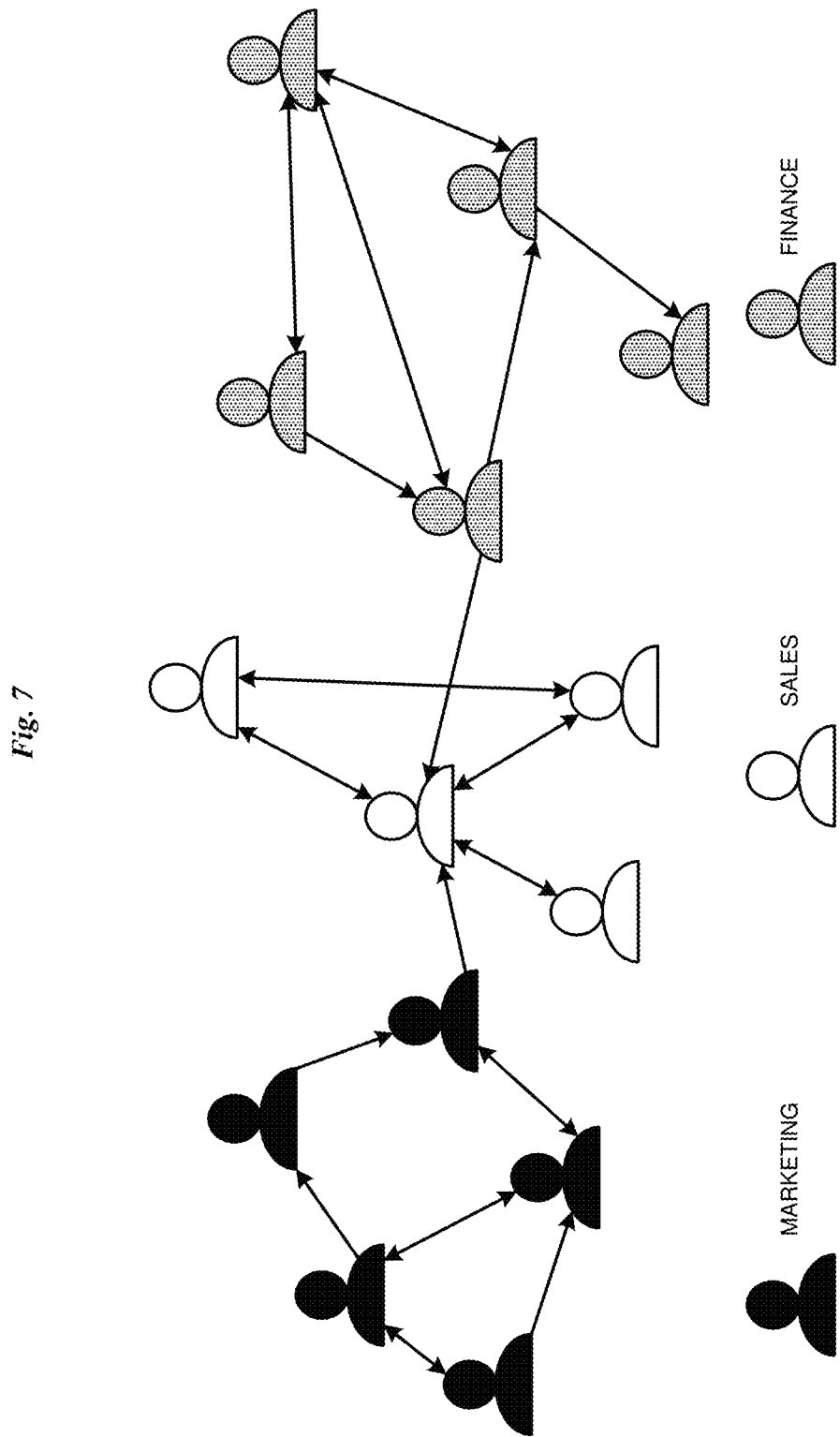
FIG. 7 depicts a schematic diagram of an example sampling of a group of users with an illustrative embodiment.

With reference to FIG. 7, this figure depicts an example of a group setting on which the SDT can be generalized. For example, the SDT model can be applied to individuals in a department in a company. This may be advantageous so that the entire set of surveys has a similar tone and word usage. This may also cut down on the time spent on analyzing the signature discourse history of each individual user.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    detecting, using corpus linguistics, a signature discourse utterance of a user by analyzing a user's discourse history;
    computing a term frequency of a collection of words used repeatedly by the user and distinct to the user;
    sensing, using tone analysis and natural language process modeling, a tone of the collection of words distinct to the user in the signature discourse utterance;
    deriving a signature discourse transformation (SDT) model from the signature discourse utterance, the collection of words used repeatedly by the user, and the tone; and
    transforming, using the signature discourse transformation (SDT), an original writing by the user into an anonymized text.

2. The computer-implemented method of claim 1, wherein the user's discourse history includes emails, reports, and chat history.

3. The computer-implemented method of claim 1, wherein computing a term frequency includes analyzing a user's collocations and colligations.

4. The computer-implemented method of claim 1, wherein the natural language process modeling includes word2vec modelling.

5. The computer-implemented method of claim 1, further comprising mapping a cartesian value of the term frequency of a collection of words used repeatedly by the user and distinct to the user.

6. The computer-implemented method of claim 5, wherein mapping a cartesian value of the word and the collection of words used repeatedly by the user and distinct to the user further comprises transforming the x, y coordinates and validating meaning and the tone of the user's signature utterance.

7. The computer-implemented method of claim 1, wherein mapping a cartesian value comprises an affine transformation.

8. The computer-implemented method of claim 1, wherein the anonymized text maintains an original meaning of the original writing of the user.

9. The computer-implemented method of claim 1, further comprising determining a degree of transforming of an original discourse by the user into an anonymized text.

10. The computer-implemented method of claim 8, further comprising adjusting the original writing to remove a linguistic monument from the writing.

11. A computer program product comprising one or more computer readable storage media, and program instructions collectively stored on the one or more computer readable storage media, the program instructions executable by a processor to cause the processor to perform operations comprising:
    detecting, using corpus linguistics, a signature discourse utterance of a user by analyzing a user's discourse history;
    computing a term frequency of a collection of words distinct to the user;
    sensing, using Tone Analysis and natural language process modeling, a tone of the collection of words distinct to the user in the signature discourse utterance;
    deriving a signature discourse transformation (SDT) model from the signature discourse utterance, the term frequency; the tone, and the collection of words; and
    transforming, using the signature discourse transformation (SDT), an original writing by the user into an anonymized text.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    mapping a cartesian value of the word and the collection of words distinct to the user.

14. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    generalizing the SDT across a group of individuals; and
    determining a degree of transforming an original writing by the user into an anonymized text based on the group of individuals.

15. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

determining a degree of transforming an original writing by the user into an anonymized text;

adjusting the original writing to remove a linguistic monument from the writing.

16. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

determining a degree of transforming an original writing by the user into an anonymized text.

17. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

18. A computer system comprising a processor and one or more computer readable storage media, and program instructions collectively stored on the one or more computer readable storage media, the program instructions executable by the processor to cause the processor to perform operations comprising:

detecting, using corpus linguistics, a signature discourse utterance of a user by analyzing the user's discourse history;

computing a term frequency of a collection of words distinct to the user;

sensing, using tone analysis and natural language process modeling, a tone of a collection of words distinct to the user in the signature discourse utterance;

mapping a cartesian value of the word and the collection of words distinct to the user;

deriving a signature discourse transformation (SDT) model from the signature discourse utterances, the term frequency; the tone, the collection of words, and the cartesian value; and transforming, using the signature discourse transformation (SDT), an original writing by the user into an anonymized text.

19. The computer system of claim 18, further comprising:
generalizing the SDT across a group of individuals and
determining a degree of transforming an original discourse by the user into an anonymized text based on the group of individuals.

20. The computer system of claim 18, further comprising determining a degree of transforming an original writing by the user into an anonymized text.

* * * * *